Nov. 6, 1962  V. L. SODERBERG  3,062,227
DEVICES FOR CLEANING CONVOLUTED TUBING
Filed March 14, 1960  3 Sheets-Sheet 2
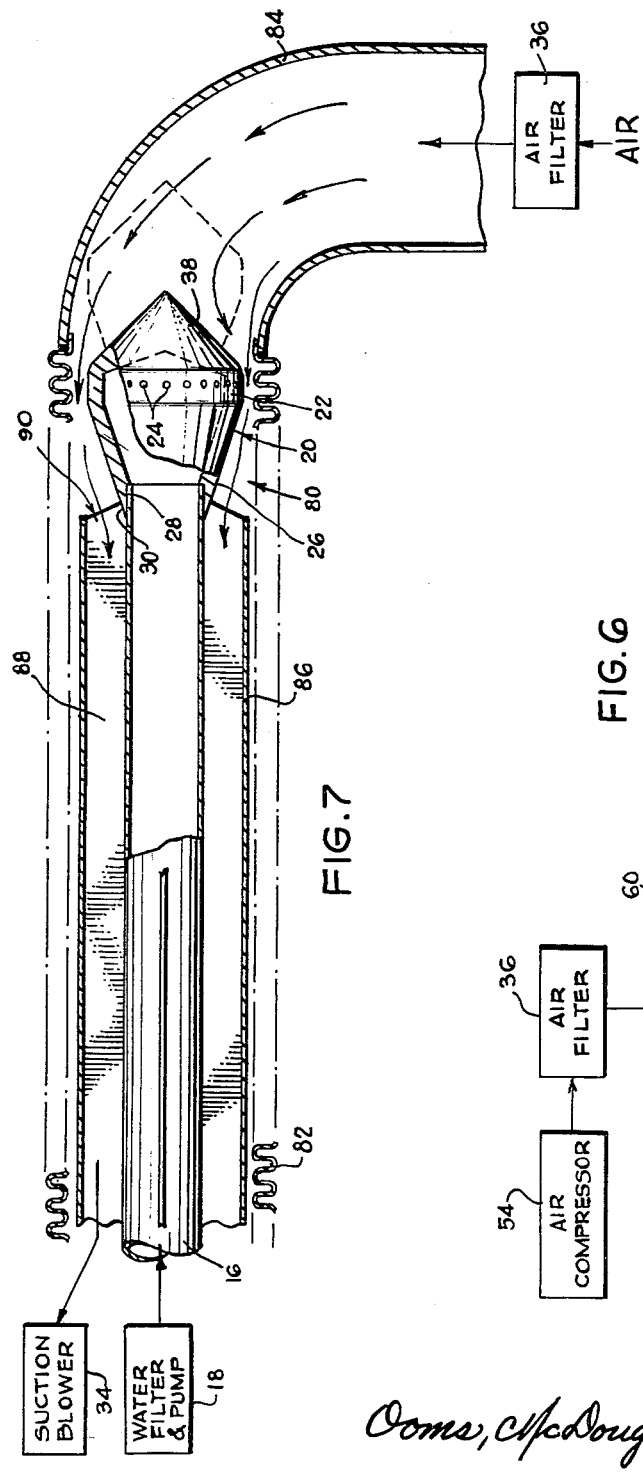
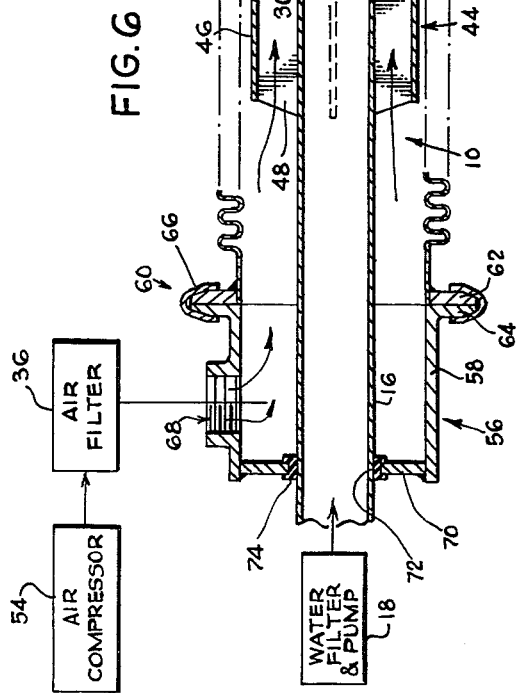
INVENTOR.
VICTOR L. SODERBERG
BY
Ooms, McDougall, Williams & Hersh
ATTORNEYS

United States Patent Office 3,062,227
Patented Nov. 6, 1962

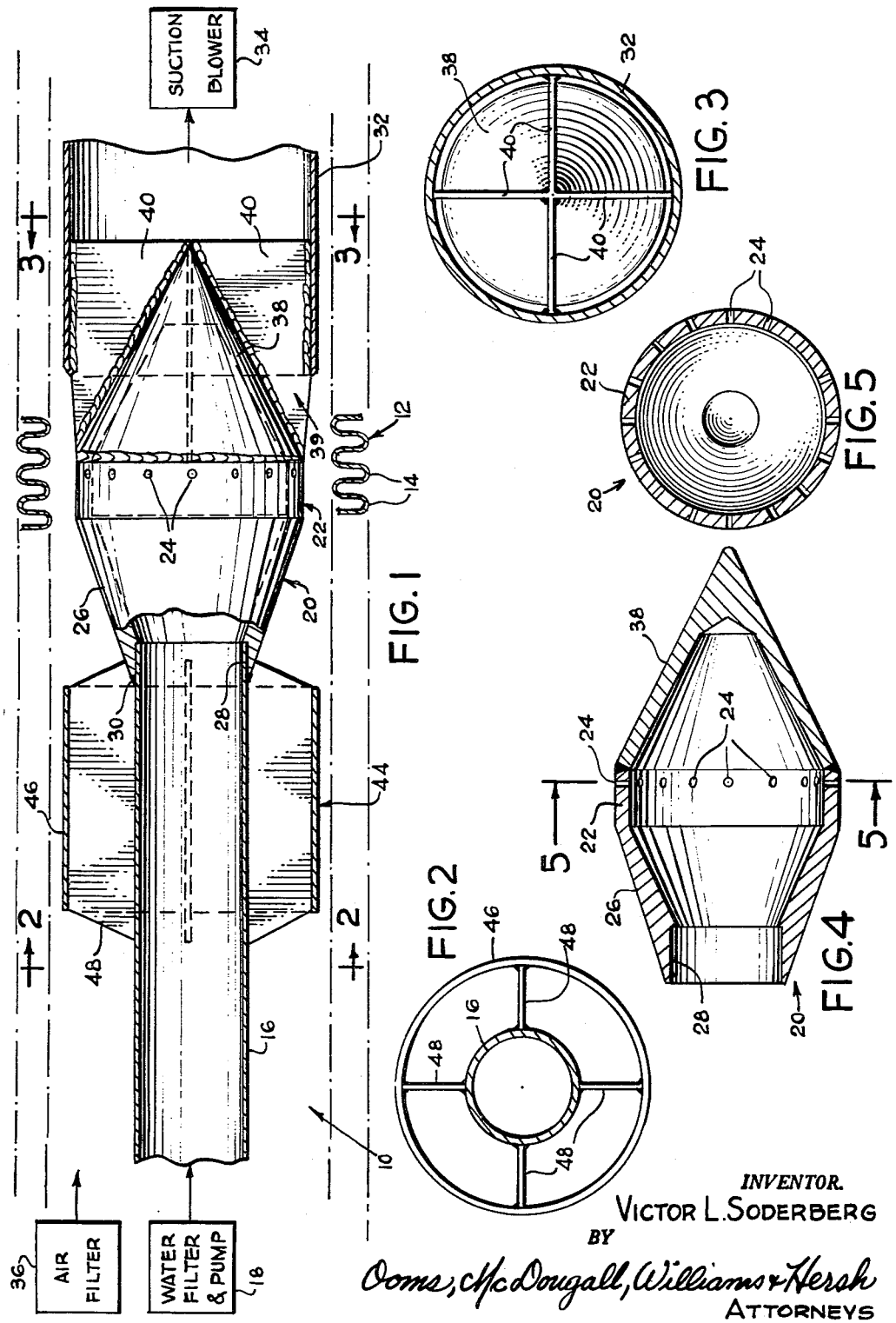

3,062,227
DEVICES FOR CLEANING CONVOLUTED TUBING
Victor L. Soderberg, Elgin, Ill., assignor, by mesne assignments, to D K Manufacturing Company, Chicago, Ill., a corporation of Illinois
Filed Mar. 14, 1960, Ser. No. 14,746
6 Claims. (Cl. 134—168)

This invention relates to new and improved devices for cleaning convoluted tubing, bellows or the like. The invention is also applicable to the cleaning of plain cylindrical tubing, particularly long lengths thereof.

Convoluted tubes, also known as bellows, are employed for many applications to carry gases, liquids, or granular material. Convoluted tubes provide conduits which are highly flexible, yet have the advantage of being made entirely of metal. Thus, convoluted tubes do not deteriorate with age, and are useable at considerably higher and lower temperatures than hoses made of rubber or other non-metallic materials. Furthermore, convoluted tubes are highly resistant to abrasion and to attack by various active solvents and chemicals.

For most ordinary purposes, the inside of a newly made convoluted tube is sufficiently clean so that it does not require special cleaning. However, for some critical applications, it is desirable to give the inside of the newly made convoluted tubing a special, extremely thorough cleaning, so that there will be no possibility that the liquid or gas to be carried by the convoluted tubing will be contaminated by foreign material that may be present within the tubing. For example, such special cleaning has often been required when the convoluted tubing is to be employed for carrying liquid oxygen which is to be supplied to the rocket motors of large missiles. In such an application, even a trace of dust or grit in the liquid oxygen may cause the rocket motors to function improperly.

Thus, one object of the present invention is to provide new and improved devices for thoroughly cleaning the inside of a length of convoluted tubing, bellows or the like, the invention also being applicable to the cleaning of plain tubing.

A further object is to provide devices of the foregoing character, in which the inside of the tubing is cleaned by one or more jets of water or other cleaning liquid, and in which the cleaning liquid and any foreign material are sucked out of the tubing.

A further object is to provide such new and improved cleaning devices which are effective and serviceable, yet are easy to use and reasonably inexpensive.

Further objects and advantages of the present invention will appear from the following description, taken with the accompanying drawings, in which:

FIG. 1 is an elevational view, partly in longitudinal section, of a cleaning device to be described as an illustrative embodiment of the present invention.

FIG. 2 is a sectional view, taken generally along a line 2—2 in FIG. 1.

FIG. 3 is a sectional view, taken generally along a line 3—3 in FIG. 1.

FIG. 4 is a fragmentary central longitudinal view showing the spray head employed in the device of FIG. 1.

FIG. 5 is a cross sectional view, taken generally along a line 5—5 in FIG. 4.

FIG. 6 is an elevational sectional view, somewhat similar to FIG. 1, but showing a modified cleaning device.

FIG. 7 is a longitudinal sectional view showing another modified cleaning device.

Figure 8:
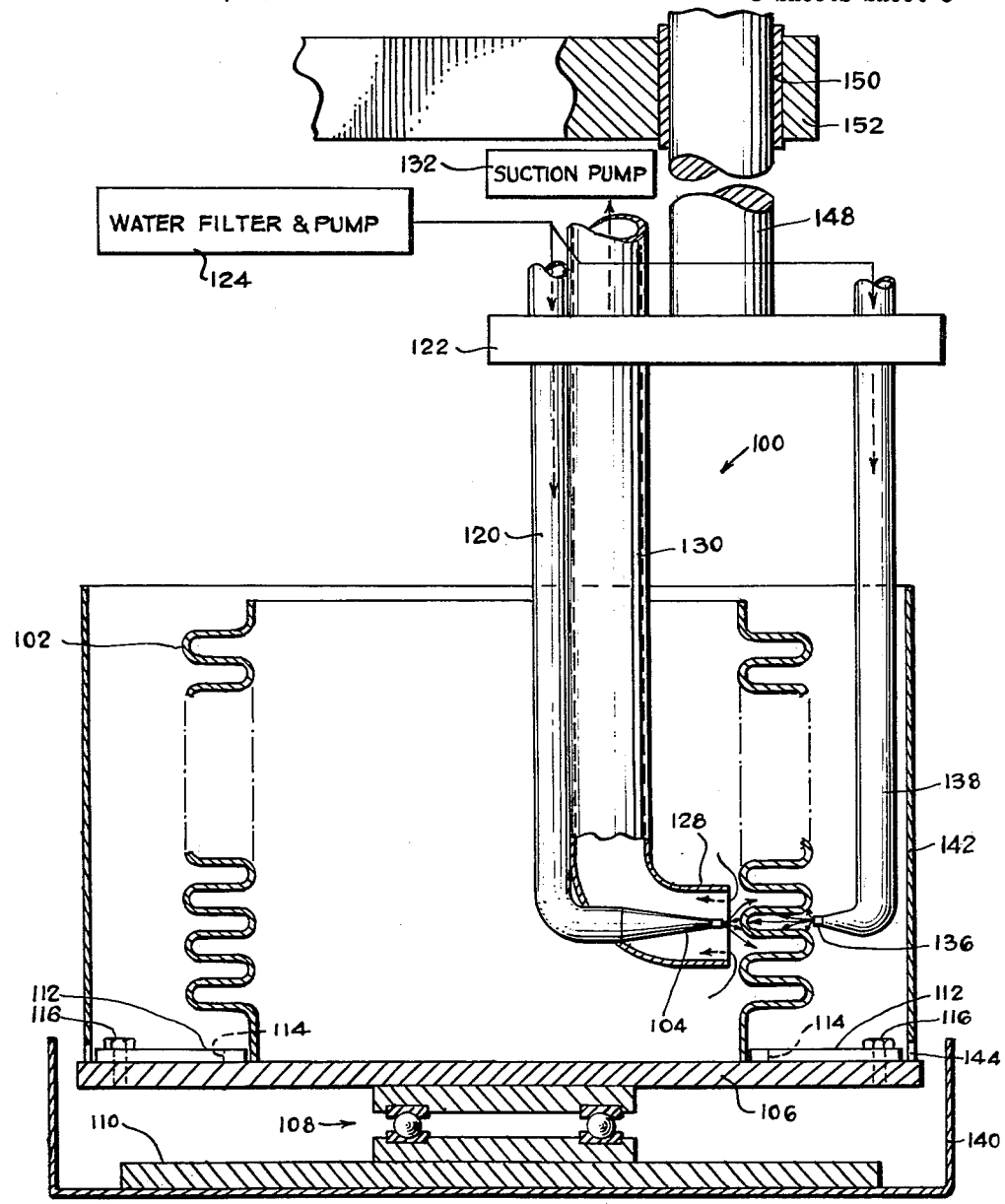
FIG. 8 is a somewhat diagrammatic elevational sectional view showing still another modified cleaning device.

As already indicated, FIGS. 1-5 illustrate a cleaning device 10 which may be employed to clean the inside of a length of convoluted tubing 12. It will be understood, of course, that the cleaning device 10 will find various other applications. As shown, the tubing 12 is formed with a large number of convolutions or corrugations 14 which extend around the periphery of the tubing 12. The convolutions 14 may be either of the helical type, also known as the spiral type, or of the parallel annular type. It will be understood that the convolutions 14 make the tubing 12 flexible so that it may be bent in the manner of a hose. The convoluted tubing 12 may be made of metal or other suitable material.

The illustrated cleaning device 10 comprises a supply pipe or tube 16 through which water or some other cleaning fluid is forced into the convoluted tubing 12. For critical applications, the water or other cleaning fluid must be extremely clean and pure. As shown diagrammatically in FIG. 1, water may be supplied to the left hand end of the supply pipe 16 by means of a source 18 which may comprise a water filter, a deionizer, and a pump. The filter should be capable of removing all suspended particles from the water. The deionizing equipment is provided to remove virtually all dissolved material from the water. Of course, distilled water may be employed, in which case the deionizing equipment will not be necessary. The pump should be capable of forcing a large quantity of water into the pipe 16 at high pressure.

It will be seen that the supply pipe 16 is adapted to be inserted longitudinally through the convoluted tubing 12. Thus, the supply pipe 16 should be long enough to go all the way through the convoluted tubing to be cleaned.

It will be seen that a spray head 20 is mounted on the right hand end of the supply pipe 16. As shown, the spray head 20 has a cylindrical outer wall 22 which is substantially larger in diameter than the supply pipe 16. A plurality of small orifices or holes 24 are formed in the cylindrical wall 22 to direct the water outwardly into the convolutions of the tubing 12 in a large number of powerful jets. As shown the orifices 24 extend radially through the cylindrical wall 22 and are arranged in an annular row which extends around the periphery of the cylindrical wall. The illustrated holes 24 are equally spaced in the row.

It will be seen that the cylindrical wall 22 of the spray head 20 is substantially larger in diameter than the supply pipe 16. To provide for this change in diameter, the spray head 20 has an inlet portion 26 which is frustoconical in shape so as to flare outwardly from the supply pipe 16 to the cylindrical portion 22. The supply pipe 16 is received within a bore 28 formed in the left hand end of the spray head 20. Suitable welds 30 or other fastening means may be employed to secure the spray head 20 to the supply pipe 16. Of course, the joint between the supply pipe and the spray head should be tight so as to prevent leakage of water.

The cleaning fluid and any foreign material are drawn out of the convoluted tubing 12 through an exhaust pipe or tube 32 which has its axis aligned with the axis of the supply pipe 16. The exhaust pipe 32 is also adapted to be inserted through the convoluted tubing 12, and thus should be long enough to go all the way through the tubing. A suction blower 34 may be connected to the right hand end of the exhaust pipe 32, so as to draw the water, any foreign material, and air from the convoluted tubing 12. To prevent contamination of the inside of the tubing 12 by the incoming air, the air should be supplied to the left hand end of the tubing 12 through a filter 36 capable of removing all foreign particles from the air.

As shown, the spray head 20 has a closed right hand end portion 38 which tapers to a point and is substantially conical in shape. The conical portion 38 extends into the left hand end of the exhaust pipe 32 but is spaced therefrom so as to leave an opening 39 through which the water, air and foreign material may pass into the pipe 32. In this case, the left hand end of the exhaust pipe 32 is secured to the spray head 20 by means of a plurality of longitudinal radial plates 40 which are generally triangular shaped. In this case, the plates 40 are welded or otherwise suitably secured to the outside of the conical member 38, and to the inside of the exhaust pipe 32. As shown to advantage in FIG. 3, four of the plates 40 are employed in the illustrated construction. The plates or ribs 40 form a rigid connection between the spray head 20 and the exhaust pipe 32, without substantially impeding the flow of water, air and foreign material into the exhaust pipe 32.

It will be seen that the exhaust pipe 32 is only slightly smaller in diameter than the inside of the convoluted tubing 12. Thus, the exhaust pipe 32 may be inserted comfortably through the convoluted tubing, without any great or excessive clearance therebetween. The diameter of the spray head 20 corresponds generally to the diameter of the exhaust pipe 32 but actually is slightly smaller.

In the illustrated arrangement, the supply pipe 16 is considerably smaller in diameter than the exhaust pipe 32, so as to afford room between the exhaust pipe and the convoluted tubing for the passage of incoming air therebetween. One or more guides 44 are preferably mounted around the supply pipe 16 so as to center the supply pipe within the tubing 12. As shown, the guide 44 comprises a cylindrical sleeve or ring 46 which corresponds in diameter to the exhaust pipe 32. The sleeve 46 is connected to the pipe 16 by means of a plurality of longitudinal radial plates or webs 48 which may be welded or otherwise suitably secured to the inside of the sleeve 46 and to the outside of the pipe 16. The plates 48 form rigid connections between the sleeve 46 and the pipe 16, without substantially impeding the flow of air along the space between the inside of the convoluted tubing 12 and the outside of the pipe 16. It will be evident that the guide 44 centers the spray head 20 within tubing 12. In this case, the guide 44 is mounted on the right hand end of the supply pipe 16, adjacent the spray head 20.

In the operation of the cleaning device 10, the convoluted tubing 12 is slipped over the supply pipe 16 and the exhaust pipe 32 so that the spray head 20 will be within the extreme left hand end portion of the tubing. The water source 18 is connected to the left hand end of the supply pipe 16. A further connection is established between the right hand end of the exhaust pipe 32 and the suction blower 34. Another connection is made between the air filtering unit 36 and the left hand end of the convoluted tubing 12.

Clean water under considerable pressure is pumped into the supply pipe 16, so that forceful jets of water will be directed outwardly by the orifices or openings 24 in the spray head 20. The water jets scrub off the inside of the convoluted tubing 12 so that any dust or other foreign particles will be dislodged from the tubing. The water spray, foreign material and air are drawn into the exhaust pipe 32 by the suction blower 34.

The conical member 38 on the right hand end of the spray head 20 is effective to direct and guide the mixture of water spray and air into the exhaust pipe 32. It will be apparent that the mixture of spray and air enters the exhaust pipe 32 through the opening 39 between the concial member 38 and the left hand end of the exhaust pipe 32.

The suction blower 34 induces an inflow of air into the left hand end of the convoluted tubing 12. The incoming air passes into the tubing through the air filter unit 36, which removes any dust or other foreign material in the air so that the clean interior of the convoluted tubing 12 will not be contaminated.

As the cleaning operation is carried out, the supply pipe 16, the spray head 20 and the exhaust pipe 32 are moved to the right down the length of the convoluted tubing 12. Alternatively, the tubing 12 may be moved to the left while the spray head 20 remains stationary. In this way, the entire length of the convoluted tubing 12 will be cleaned out.

The powerful suction produced by the blower 34 draws out virtually all of the water from the convoluted tubing 12. Any remaining water is evaporated by the inrushing current of clean air. The resulting water vapor is drawn off by the suction blower 34. Thus, the inside of the convoluted tubing 12 is left dry as well as clean.

After the inside of the convoluted tubing 12 has been cleaned out, the supply pipe 16, spray head 20 and exhaust pipe 32 are removed from the tubing. The ends of the tubing 12 are then covered or closed so as to prevent any dust or other contaminating material from entering the tubing.

It will be apparent that the tubing is cleaned out with a high degree of effectiveness. Nevertheless, the cleaning operation may be carried out easily and expeditiously.

In the arrangement of FIGS. 1–5, the movement of air through the cleaning device is due entirely to the action of the suction blower 34, which produces a partial vacuum within the exhaust pipe 32. FIG. 6 illustrates a modified arrangement, which is the same as that of FIGS. 1–5, except that an air compressor 54 is provided to supply compressed air to the cleaning device. The compressed air is directed through the air filter 36 and then into the inside of the convoluted tube or bellows 12 at the left hand end thereof. It will be seen that a special fitting or device 56 is employed to direct the compressed air into the left hand end of the convoluted tube 12. As shown, the fitting 56 comprises a short length of cylindrical tubing or pipe 58 which is connected to the left hand end of the convoluted tube 12 by means of a suitable coupling 60. In the illustrated construction, the left hand end of the convoluted tube 12 is provided with an outwardly extending flange 62. A complementary flange 64 is mounted on the right hand end of the cylindrical tube 58. The flanges 62 and 64 may be secured together by means of a ring clamp 66, or any other suitable device.

The cylindrical tube 58 has an opening 68 therein, through which the compressed air is admitted into the tube 58. The left hand end of the tube 58 is closed by an end wall 70 which is generally in the form of a disk and is provided with an axial opening 72, through which the water inlet pipe 16 is adapted to extend. A suitable sealing device, such as the illustrated packing ring 74, is mounted on the end wall 70 around the opening 72 to prevent leakage of air between the water inlet pipe 16 and the end wall 70. The sealing ring 74 permits the inlet pipe 16 to slide through the opening 72, so that the entire length of the convoluted tube 12 may readily be cleaned.

The provision of the air compressor 54 makes it possible to bring about a great increase in the flow of air through the cleaning device. As before, the air enters the left hand portion of the convoluted tube 12 and passes out through the outlet pipe 32. The air picks up the water spray generated by the spray head 20, along with any dirt or other foreign material dislodged from the inside of the tube 12 by the water spray. In this case, the provision of the air compressor 54 makes it unnecessary to employ the suction blower 34. However, both the suction blower 34 and the air compressor 54 may be employed, if desired. An additional sealing ring 78 may be provided around the outside of the outlet pipe 32 to prevent or minimize the flow of air between the outside of the outlet pipe 32 and the inside of the convoluted tube 12.

FIG. 7 illustrates another modified cleaning device 80 which is adapted to clean a tube or bellows 82 having an elbow 84 therein. For such cleaning jobs, the cleaning device 10 of FIGS. 1–6 is not applicable, because the cleaning device 10 will not pass through the elbow 84. This is true because the cleaning device 10 is double ended, with the inlet pipe 16 at one end and the outlet pipe 32 at the other. The cleaning device 80 of FIG. 7 is similar to the cleaning device 10, except that the cleaning device 80 is single ended. Thus, the outlet pipe 32 is eliminated and is replaced with an outet pipe 86 which is disposed coaxially around the inlet pipe 16. Longitudinal fins or webs 88 are provided between the outside of the inlet pipe 16 and the inside of the outlet pipe 86, to support the outlet pipe while permitting the free flow of air along the outlet pipe 86. The outlet pipe 86 also performs the centering function of the guide 44, which is not used in the cleaning device 80. At its right hand end, the outlet pipe 86 terminates just short of the spray head 20, so that an opening 90 is formed between the right hand end of the outlet pipe 86 and the right hand portion of the inlet pipe 16.

In this case, the suction blower 34 is connected to the left hand end of the outlet pipe 86. Air is admitted to the opposite end of the convoluted tube 82 through the air filter 36 and the elbow 84. As before, the combined water pump, filter and deionizer 18 is connected to the left hand end of the inlet pipe 16.

In cleaning the convoluted tube 82, the cleaning device 80 is inserted into the left hand end of the convoluted tube as far as it will go until the spray head 20 enters the elbow 84 as shown in broken lines in FIG. 7. The water pumping unit 18 is then activated so that a powerful spray of water will be directed outwardly into the tube 82 through the opening 24 in the spray head 20. The suction blower 34 generates a partial vacuum within the exhaust tube 86, with the result that air and the water spray are drawn into the right hand end of the exhaust tube 86, along with any foreign material washed from the inside of the convoluted tube 82. To complete the cleaning of the convoluted tube 82, the cleaning device 80 is gradually moved to the left, or the convoluted tube 82 is moved to the right, so that the water spray will be played against the inside of the tube 82 along its entire length. The suction generated by the blower 34 removes all of the water so that the inside of the convoluted tube 82 will be left dry as well as clean.

FIG. 8 illustrates another modified cleaning device 100, adapted to clean the inside of a large heavy convoluted tube or bellows 102. In this case, the convoluted tube 102 is relatively short in length but is quite large in diameter. Instead of a plurality of spray orifices, the cleaning device 100 is provided with a single spray nozzle 104 which is directed radially against the inside of the convoluted tube 102. Provision is made for effecting relative rotation between the spray nozzle 104 and the convoluted tube 102, so that the entire inner periphery of the tube 102 will be cleaned. Thus, the illustrated cleaning device 100 includes a turntable 106 on which the convoluted tube 102 is mounted. As shown, the turntable 106 is horizontal and is adapted to support the convoluted tube 102 in a vertical position. The turntable 106 is supported for free rotation on an anti-friction bearing 108 which is mounted on a base 110. The convoluted tube 102 may be located and centered on the turntable 106 by means of a plurality of adjustable stops 112 mounted thereon. As shown, the stops 112 take the form of bars with slots 114 therein. The bars 112 are secured to the turntable 106 by means of screws 116 which extend through the slots 114 and are threaded into the turntable.

It will be seen that the spray nozzle 104 is bent at right angles from the lower end of a water inlet pipe 120 which extends downwardly into the convoluted tube 102 from a support 122. A unit 124 is provided to force water or other cleaning fluid into the upper end of the inlet pipe 120. As before, the unit 124 may comprise a pump to generate water pressure, a filter to remove any suspended particles from the water, and a deionizer to remove substantially all of the dissolved material from the water. Thus, the water will be extremely clean and pure. The water pressure forces a powerful spray of water outwardly through the spray nozzle 104 against the inside of the convoluted bellows 102. The turntable 106 is rotated, either by hand or by any suitable driving motor, so that the water spray will be played around the entire inside of the convoluted tube 102.

A suction or exhaust nozzle 128 is provided adjacent the spray nozzle 104, to draw off the water spray and any foreign material washed from the inside of the convoluted bellows 102. In this case, the spray nozzle 104 extends coaxially within the exhaust nozzle 128. It will be seen that the exhaust nozzle 128 is bent at right angles from the lower end of a vertical suction or exhaust pipe 130 which also extends downwardly from the support 122. A suction pump or blower 132 is connected to the upper end of the suction pipe 130, so as to produce a partial vacuum therein.

In this case, provision is also made for washing the outside of the convoluted tube 102. Thus, the cleaning device 100 is provided with an additional spray nozzle which is directed inwardly in a radial direction from the lower end of a water supply pipe 138. The water spray from the nozzle 136 is directed against the outside of the convoluted bellows 102. It will be seen that the pipe 138 also extends downwardly from the support 122. The upper end of the pipe 138 may also be connected to the water pumping unit 124. Inasmuch as the cleaning of the outside of the convoluted tube 102 is much less critical than the cleaning of the inside of the tube, the water directed against the outside of the tube 102 is merely allowed to drain off the turntable 106 into a pan or trough 140 which carries away the water. A generally cylindrical spray shield 142 is mounted on the turntable 106 around the outside of the convoluted bellows 102 to confine the water spray. Sufficient space is provided between the shield 142 and the outside of the tube 102 to admit the nozzle 136 and the water pipe 138. A plurality of drain notches or openings 144 may be provided in the lower edge of the spray shield 142.

In order that the entire length of the convoluted bellows or tube may be cleaned, the support 132 is movable vertically. As shown, a shaft or rod 148 extends upwardly from the support 122. The ilustrated shaft 148 is slidable through a bushing 150 in a fixed supporting member 152. The movable supporting arrangement for the member 122 may be similar to the vertically movable supporting arrangement for the spindle of a conventional drill press.

In cleaning the convoluted tube 102, the spray nozzle 104 and the suction nozzle 128 are moved downwardly into the convoluted tube 102 as far as possible. This may be done by hand or by a suitable power device. At the same time, the outer spray nozzle 136 is moved downwardly alongside the outside of the convoluted tube 102. The water pumping unit 124 and the suction blower 132 are then started so that the nozzle 104 and 136 will direct forceful streams of water against the inside and the outside of the convoluted bellows 102. The partial vacuum generated by the suction pump 132 draws a water spray and any foreign material from the inside of the bellows 102 into the suction nozzle 128. The water directed against the outside of the tube 102 drains away into the trough 140. During the cleaning operation, the turntable 106 is rotated so that the water sprays will engage the tube 102 all around its periphery. The support 122 is gradually moved upwardly so that the entire length of the convoluted bellows 102 will be cleaned.

It will be apparent that the cleaning devices of the present invention are highly effective to clean the inside of convoluted tubing or bellows. The cleaning devices are also applicable to the cleaning of the inside of plain cylindrical tubing. It will be understood that the cleaning operation may be carried out very easily and expeditiously.

Various modifications, alternative constructions and equivalents may be employed without departing from

I claim:

1. A device for cleaning the inside of a length of convoluted tubing, said device comprising a supply pipe, an exhaust pipe, each of said pipes being long enough to go through the tubing, said pipes having their axes aligned with each other, each of said pipes having first and second ends, said second end of said supply pipe being adjacent said first end of said exhaust pipe, a source of clean water connected to said first end of said supply pipe and including a pump for forcing the clean water into and through said supply pipe, a spray head on said second end of said supply pipe, said spray head having a generally cylindrical wall with a plurality of spray orifices extending therethrough and arranged in a peripheral row extending around said cylindrical wall for spraying the water outwardly against the inside of the convoluted tubing, said spray head having a generally conical end wall projecting into said first end of said exhaust pipe but spaced therefrom to provide an opening between said spray head and said exhaust pipe, said spray head corresponding generally in diameter to said exhaust pipe, said supply pipe being substantially smaller in diameter than said exhaust pipe, a plurality of generally longitudinal and radial plates extending between said spray head and said first ends of said exhaust pipe and forming a rigid connection therebetween, an enlarged guide disposed around said supply pipe and corresponding in diameter to said exhaust pipe, a suction blower connected to said second end of said exhaust pipe for drawing off water, air and foreign material, and means for supplying clean air to the end of the convoluted tubing adjacent said first end of said exhaust pipe.

2. A device for cleaning the inside of a length of convoluted tubing, said device comprising a supply pipe, an exhaust pipe, each of said pipes being long enough to go through the tubing, said pipes having their axes aligned with each other, each of said pipes having first and second ends, said second end of said supply pipe being adjacent said first end of said exhaust pipe, a source of clean water connected to said first end of said supply pipe and including a pump for forcing the clean water into and through said supply pipe, a spray head on said second end of said supply pipe, said spray head having a plurality of spray orifices extending therethrough for spraying the water outwardly against the inside of the convoluted tubing, said spray head having a generally conical end wall projecting into said first end of said exhaust pipe but spaced therefrom to provide an opening between said spray head and said exhaust pipe, means extending between said spray head and said first end of said exhaust pipe and forming a rigid connection therebetween, a suction blower connected to said second end of said exhaust pipe for drawing off water, air and foreign material, and means for supplying clean air to the end of the convoluted tubing adjacent said first end of said exhaust pipe.

3. A device for cleaning the inside of a length of convoluted tubing, said device comprising a supply pipe, a suction pipe, each of said pipes being long enough to go through the tubing, said pipes having their axes aligned with each other, each of said pipes having first and second ends, said second end of said supply pipe being adjacent said first end of said suction pipe, a spray head on said second end of said supply pipe, said spray head having a generally cylindrical wall with a plurality of spray orifices extending therethrough and arranged in a peripheral row extending around said cylindrical wall, said spray head having a generally conical end wall projecting into said first end of said suction pipe but spaced therefrom to provide an opening between said spray head and said suction pipe, said spray head corresponding generally in diameter to said exhaust pipe, said supply pipe being substantially smaller in diameter than said exhaust pipe, a plurality of generally longitudinal and radial plates extending between said spray head and said first end of said suction pipe and forming a rigid connection therebetween, and an enlarged guide disposed around said supply pipe and corresponding in diameter to said suction pipe.

4. In a device for cleaning the inside of tubing, the combination comprising a supply pipe movable into the tubing, a spray head on one end of said supply pipe and having a generally radial orifice means therein for directing a spray of cleaning fluid against the inside of the tubing, an exhaust pipe movable along with said supply pipe into the tubing, said exhaust pipe having an open end disposed closely adjacent said spray head for drawing off the expended spray and any dislodged foreign material, a connective fitting for receiving one end of the tubing, means for supplying air under pressure to said connective fitting to carry the spray and foreign material into said exhaust pipe, said connective fitting having an end wall with an opening therein, said supply pipe being movable through said opening, and sealing means around said opening to prevent leakage of fluid and air through said opening.

5. In a device for cleaning the inside of tubing, the combination comprising a supply pipe movable into the tubing, a spray head on one end of said supply pipe and having generally radial orifice means therein for directing a spray of cleaning liquid against the inside of the tubing, an exhaust pipe movable along with said supply pipe into the tubing, said exhaust pipe having an open end disposed closely adjacent said spray head for drawing off the expended spray and any dislodged foreign material, means for supplying cleaning liquid under pressure to said supply pipe, a suction blower connected to said exhaust pipe for drawing off the expended liquid, any foreign material and air, and means for supplying clean air to one end of the tubing to carry the expended liquid and foreign material into said exhaust pipe.

6. In a device for cleaning the inside of tubing, the combination comprising a supply pipe movable into the tubing, a spray head on one end of said supply pipe and having generally radial orifice means therein for directing a spray of cleaning liquid against the inside of the tubing, an exhaust pipe movable along with said supply pipe into the tubing, said exhaust pipe having an open end disposed closely adjacent said spray head for drawing off the expended spray and any dislodged foreign material, means for supplying cleaning liquid under pressure to said supply pipe, a suction blower connected to said exhaust pipe for drawing off the expended liquid, any foreign material and air, and means including a source of air under pressure for supplying clean air to the tubing for carrying the expended liquid and foreign material into said exhaust pipe.

References Cited in the file of this patent

UNITED STATES PATENTS

| | | |
|---|---|---|
| 1,796,878 | Watson | Mar. 17, 1931 |
| 1,806,478 | Long | May 19, 1931 |
| 2,018,284 | Schweitzer | Oct. 22, 1935 |
| 2,497,171 | Jones | Feb. 14, 1950 |